(12) United States Patent
Yao et al.

(10) Patent No.: US 11,958,741 B2
(45) Date of Patent: *Apr. 16, 2024

(54) METHOD FOR SPLITTING CARBON DIOXIDE INTO MOLECULAR OXYGEN AND CARBON

(71) Applicant: California Institute of Technology, Pasadena, CA (US)

(72) Inventors: Yunxi Yao, Pasadena, CA (US); Konstantinos P. Giapis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/397,826

(22) Filed: Aug. 9, 2021

(65) Prior Publication Data
US 2021/0371280 A1  Dec. 2, 2021

Related U.S. Application Data

(63) Continuation of application No. 15/905,708, filed on Feb. 26, 2018, now Pat. No. 11,084,722.
(Continued)

(51) Int. Cl.
*C01B 13/02* (2006.01)
*B01J 19/12* (2006.01)
(Continued)

(52) U.S. Cl.
CPC ......... *C01B 13/0203* (2013.01); *B01J 19/123* (2013.01); *C01B 32/05* (2017.08);
(Continued)

(58) Field of Classification Search
CPC ........ H05H 1/46; H05H 2245/10; H05H 5/00; C01B 32/19; C01B 13/0203; C01B 32/05; B01J 19/123
See application file for complete search history.

(56) References Cited

U.S. PATENT DOCUMENTS 9,371,250 B2 *  6/2016  Sondergard ............. C03C 15/00
11,084,722 B2 *  8/2021  Yao .......................... H05H 1/46
(Continued)

FOREIGN PATENT DOCUMENTS

CN  201021441 Y  *  2/2008
EP  2106435 B1  *  11/2020  ........... C04B 35/565

OTHER PUBLICATIONS

Koizumi et al., "Dissociation of ICII-(CO2) n by Its Impact on Silicon Surface: The Role of Core Ion", The Journal of Chemical Physics, 1999, vol. 111, Issue 14, pp. 6565-6572.
(Continued)

*Primary Examiner* — Abdullah A Riyami
*Assistant Examiner* — Syed M Kaiser

(57) ABSTRACT

Apparatus and methods for facilitating an intramolecular reaction that occurs in single collisions of $CO_2$ molecules (or their derivatives amenable to controllable acceleration, such as $CO_2^+$ ions) with a solid surface, such that molecular oxygen (or its relevant analogs, e.g., $O_2^+$ and $O_2^-$ ions) is directly produced are provided. The reaction is driven by kinetic energy and is independent of surface composition and temperature. The methods and apparatus may be used to remove $CO_2$ from Earth's atmosphere, while, in other embodiments, the methods and apparatus may be used to prevent the atmosphere's contamination with $CO_2$ emissions. In yet other embodiments, the methods and apparatus may be used to obtain molecular oxygen in $CO_2$-rich environments, such as to facilitate exploration of extraterrestrial bodies with $CO_2$-rich atmospheres (e.g. Mars).

13 Claims, 8 Drawing Sheets

Related U.S. Application Data

(60) Provisional application No. 62/463,021, filed on Feb. 24, 2017.

(51) Int. Cl.
  *C01B 32/05* (2017.01)
  *C01B 32/19* (2017.01)
  *H05H 1/46* (2006.01)
  *H05H 5/00* (2006.01)

(52) U.S. Cl.
  CPC ............... *C01B 32/19* (2017.08); *H05H 1/46* (2013.01); *H05H 5/00* (2013.01); *H05H 2245/10* (2021.05)

(56) References Cited

U.S. PATENT DOCUMENTS

2012/0211651 A1* 8/2012 Vogel .................. H01J 49/326
250/296
2018/0244521 A1 8/2018 Yao et al.

OTHER PUBLICATIONS

Lu et al., "Evidence for Direct Molecular Oxygen Production in Co2 Photodissociation", Science, 2014, vol. 346, pp. 61-64.
Pysanenko et al., "Collisions of Slow Ions C3Hn+ and C3Dn+ (n=2-8) with Room Temperature Carbon Surfaces: Mass Spectra of Product Ions and the Ion Survival Probability", European Journal of Mass Spectrometry, 2008, vol. 14.6, pp. 335-343.
Schlathölter et al., "Low Energy Carbon Dioxide Scattering from Pd(111) Surfaces", Surface Science, 1995, vol. 331, pp. 311-316.
Schmidt et al., "Scattering of swift molecules, H2 and CO2, from metal surfaces", Surface Science 301.1-3 (1994): 326-336.
Wang et al., "Pathways for Nonsequential and Sequential Fragmentation of CO 2 3+ Investigated by Electron Collision", Physical Review A, 2015, vol. 91, Issue 5: 052711.
Yasumatsu et al., "Reactive Scattering of Clusters and Cluster Ions from Solid Surfaces", Reports on Progress in Physics, Year 2003, 66.10: 1783.
Barker, "Detection of Molecular Oxygen in the Martian Atmosphere", Nature, vol. 238, pp. 447-448, (Aug. 25, 1972).
Bieler et al., "Abundant molecular oxygen in the coma of comet 67P/Churyumov-Gerasimenko", Nature, vol. 526, pp. 678-681 (2015), doi: 10.1038/nature 15707.
Cyriac et al., "Low energy ionic collisions at molecular solids", Chemical Reviews, vol. 112, pp. 5356-5411 (2012), dx.doi.org/10.1021/cr200384k.
Falkowski et al., "The story of O2", Science, vol. 322, pp. 540-542 (2008), DOI: 10.1126/science.1162641.
Fuserlier et al., "Rosina/DFMS and IES observations of 67P: ion-neutral chemistry in the coma of a weakly outgassing comet", Astronomy & Astrophysics, vol. 583, No. A2, 13 pgs., (2015), DOI: 10.1051/0004-6361/201526210.
Goldsmith et al., "Herschel measurements of molecular oxygen in Orion", Astrophys. J., Aug. 20, 2011, vol. 737(96), 17 pgs.
Gordon et al., "Low-energy ion beam line scattering apparatus for surface science investigations", Review of Scientific Instruments, vol. 76, pp. 083302-1-083302-15, (2005), published online Jul. 28, 2005, https://doi.org/10.1063/1.1994987.
Grimm et al., "A Theoretical Investigation of the Low Lying Electronic States of CO2 + in Both Linear and Bent Configurations.", Physical Scripta, vol. 29, pp. 337-343 (1984).
Hall et al., "Detection of an oxygen atmosphere on Jupiter's moon Europa", Nature, vol. 373, pp. 677-679 (Feb. 23, 1995).
Hilchenbach et al., "Comet 67P/Churyumov-Gerasimenko: close-up on dust particle fragments", Astrophysical Journal Letters, vol. 816, No. L32, Jan. 10, 20166 pgs., doi:10.3847/2041-8205-816-2-L32.
Jacobs, "Reactive collisions of hyperthermal energy molecular ions with solid surfaces", Annu. Rev. Phys. Chem., Oct. 2002, vol. 53, pp. 379-407.
Johnson et al., "Production, ionization and redistribution of O2 in Saturn's ring atmosphere", Icarus 180, 393-402 (2006).
Kasting et al., "Oxygen levels in the prebiological atmosphere", Journal of Geophysical Research, vol. 84, No. C6, pp. 3097-3107 (Jun. 20, 1979).
Krüger et al., "Cosima-Rosetta calibration for in situ characterization of 67P/Churyumov-Gerasimenko cometary inorganic compounds", Planetary and Space Science, vol. 117, pp. 35-44 (2015), available online May 22, 2015, http//:dx.doi.org/10.1016/j.pss.2015.05.005.
Larimian et al., "Molecular oxygen observed by direct photoproduction from carbon dioxide", Phys. Rev. A, Jan. 27, 2017, vol. 95, 011404(R).
Larsson et al., "Molecular oxygen in the ρ Ophiuchi cloud", Astronomy & Astrophysics, vol. 466, pp. 999-1003 (2007), DOI:10.1051/0004-6361:20065500.
Liu et al., "Enhanced electrocatalytic CO2 reduction via field-induced reagent concentration", Nature, vol. 537, 382-386 (Sep. 15, 2016), doi:10.1038/nature19060.
Mace et al., "Evidence of simultaneous double-electron promotion in F+ collisions with surfaces", Physical Review Letters, vol. 97, pp. 257603-1-257603-4, (Dec. 22, 2006), DOI: 10.1103/PhysRevLett.97.257603.
Nilsson et al., "Birth of a comet magnetosphere: a spring of water ions", Science, vol. 347, Issue 6220, pp. aaa0571-1-aaa0571-4, (2015).
Nilsson et al., "Evolution of the ion environment of comet 67P/Churyumov-Gerasimenko observations between 3.6 and 2.0 AU", Astronomy & Astrophysics, vol. 583, No. A20, 8 pgs., (2015), DOI: 10.1051/0004-6361-201526142.
Owen, "The Search for Early Forms of Life in Other Planetary Systems: Future Possibilities Afforded by Spectroscopic Techniques", Strategies for the Search for Life in the Universe, vol. 83, pp. 177-185 (1980).
Pfeiffer et al., "Electronic structure and geometry of NO2+ and NO2−", Journal of Chemical Physics, vol. 51, No. 1, pp. 190-202 (1969), published online Sep. 5, 2003, https://doi.org/10.1063/1.1671707.
Rosen et al., "Ionic liquid-mediated selective conversion of CO2 to CO at low overpotentials", Science, vol. 334, pp. 643-644 (Nov. 4, 2011), published online Sep. 29, 2011, DOI: 10.1126/science.1209786 (originally).
Segura et al., "Abiotic formation of O2 and O3 in high-CO2 terrestrial atmospheres", Astronomy & Astrophysics, vol. 472, pp. 665-679 (2007), DOI: 10.1051/0004-6361:20066663.
Spence et al., "Cross sections for production of O2− and C− by dissociative electron attachment in CO2: an observation of the Renner-Teller effect", Journal of Chemical Physics, vol. 60, No. 1, pp. 216-220 (Jan. 1, 1974), https://doi.org/10.1063/1.1680770.
Spencer et al., "Efficiency of CO2 dissociation in a radio-frequency discharge", Plasma Chem. Plasma Phys., vol. 31, pp. 79-89 (2010), published online Nov. 12, 2010, DOI 10.1007/s11090-010-9273-0.
Suits et al., "Hot molecules-off the batten path", Science, Oct. 3, 2014, vol. 346, pp. 30-31.
Walsh, "The electronic orbitals, shapes, and spectra of polyatomic molecules", Part II: Non-hydride AB2 and BAC molecules, J. Chem. Soc., pp. 2266-2288 (1953).
Wang et al., "Dissociative electron attachment to CO2 produces molecular oxygen", Nature Chem., Jan. 4, 2016, vol. 8, 6 pgs.
Yao et al., "Dynamic molecular oxygen production in cometary comae", Nature Comm., May 8, 2017, DOI: 10.1038/ncomms15298, 8 pgs.
Yao et al., "Dynamic nitroxyl formation in the ammonia oxidation on platinum via Eley-Rideal reactions", Phys. Chem. Chem. Phys., Oct. 14, 2016, vol. 18, pp. 29858-29863.
Yao et al., "Intramolecular water-splitting reaction in single collisions of water ions with surfaces", Chem. Sci., Jan. 14, 2017, vol. 8, pp. 2852-2858.
Yao et al., "Tuning Charge Transfer in Ion-Surface Collisions at Hyperthermal Energies", ChemPhysChem, Feb. 25, 2016, , 5 pgs. DOI: 10.1002/cphc.201600045.

(56) References Cited

OTHER PUBLICATIONS

Yao et al. et al., "Direct hydrogenation of dinitrogen and dioxygen via Eley-Rideal reactions", Angew. Chem. Int. Ed., vol. 55, pp. 11595-11599 (2016), DOI: 10.1002/anie.201604899.
Yao et al., "Kinematics of Eley-Rideal reactions at hyperthermal energies", Physical Review Letters, vol. 116, pp. 253202-1-253202-5 (Jun. 24, 2016), DOI: 10.1103/PhysRevLett.116.253202.

* cited by examiner

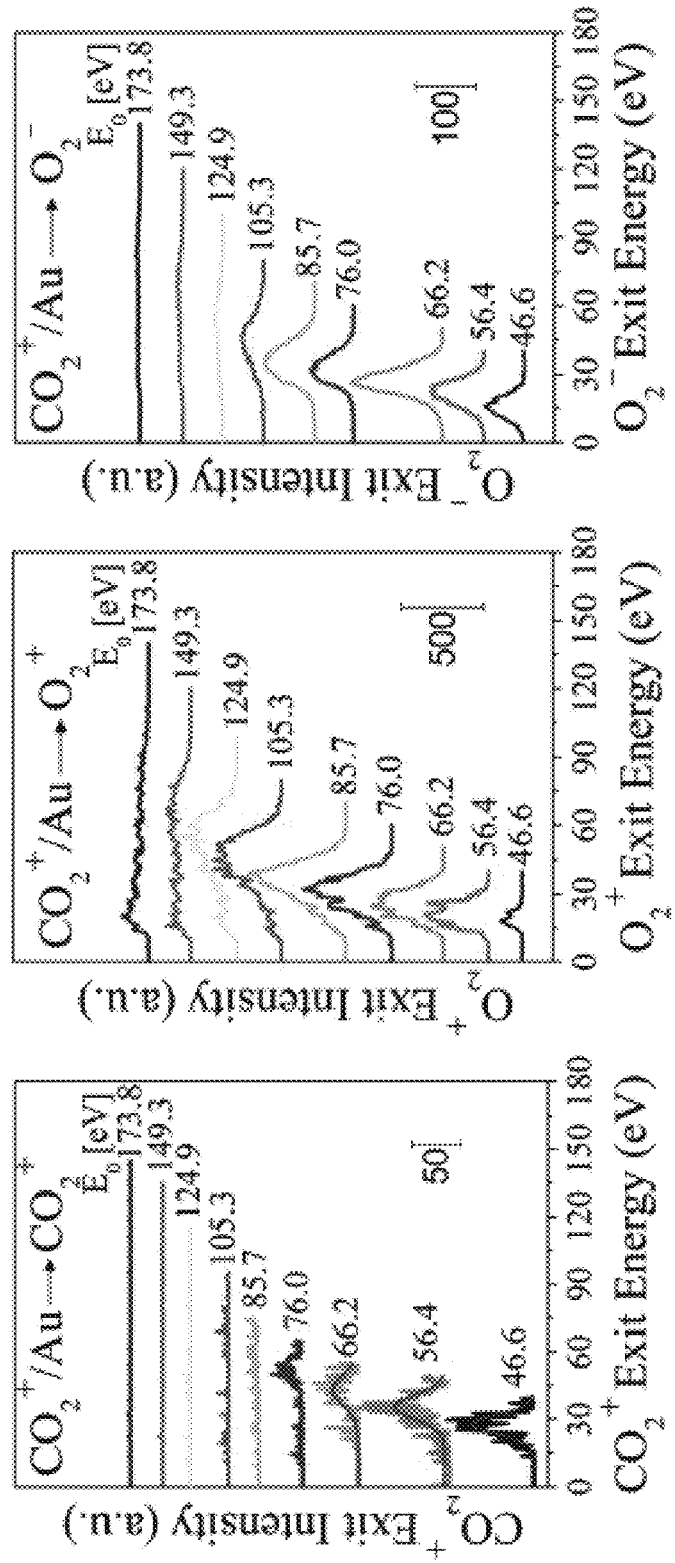

METHOD FOR SPLITTING CARBON DIOXIDE INTO MOLECULAR OXYGEN AND CARBON

CROSS-REFERENCE TO RELATED APPLICATIONS

The application is a continuation of U.S. patent application Ser. No. 15/905,708, filed, Feb. 26, 2018, entitled "Method for Splitting Carbon Dioxide into Molecular Oxygen and Carbon," which claims priority to U.S. Provisional Application No. 62/463,021, filed Feb. 24, 2017, entitled "Method for Splitting Carbon Dioxide into Molecule Oxygen and Carbon," the disclosures of which are incorporated herein by reference in their entireties.

STATEMENT OF FEDERAL SUPPORT

This invention was made with government support under Grant No. PHY1202567 awarded by the National Science Foundation. The government has certain rights in the invention.

FIELD OF THE INVENTION

Apparatus and methods for producing molecular oxygen (or its relevant analogs, e.g., $O_2^+$ and $O_2^-$ ions) directly from $CO_2$ molecules are provided.

BACKGROUND OF THE INVENTION

Carbon dioxide ($CO_2$) is a symmetric linear triatomic molecule, wherein carbon atom is covalently bound to two oxygen atoms via strong double bonds. Trace amounts of $CO_2$, a colorless gas, occur naturally in the Earth's atmosphere, wherein its current concentration is ~0.04% (405 ppm) by volume, having risen from pre-industrial levels of 280 ppm. However, despite a seemingly low concentration, $CO_2$ gas is the main contributor to the atmospheric greenhouse effect, and, therefore, is of major concern to humanity, especially in view of the alarmingly rapid increases of its atmospheric concentration in recent decades. Consequently, various technologies for $CO_2$ sequestration from the Earth's atmosphere are currently being investigated and pursued, although no definitive solution has been found to date.

In contrast, dioxygen gas ($O_2$) is the basis of life on Earth and is rather abundant in the atmosphere. However, an oxygen-rich atmosphere is quite unique to Earth, because, although elemental oxygen is the third most abundant element in the universe, its molecular dioxygen form is very rare. Specifically, in contrast to Earth, where oxygenic photosynthesis has made $O_2$ abundant, interstellar and cometary oxygen atoms are chemically bound to other elements in compounds such as $H_2O$, $CO_2$, CO, silicates, and metal oxides, making the release of $O_2$ from these reservoirs difficult and energetically very expensive. As such, only tenuous amounts of dioxygen are found elsewhere in our solar system, e.g., in the moons of Jupiter and Saturn and on Mars; in fact, the abundance of molecular oxygen has been suggested as a promising biomarker. Accordingly, efficient generation of $O_2$ from $CO_2$ is particularly desirable for space travel to Mars, Venus, and other planetary bodies with $CO_2$-rich atmospheres.

SUMMARY OF THE INVENTION

Embodiments are directed to methods and apparatus for forming molecule oxygen from carbon dioxide molecules.

In many embodiments the methods for splitting carbon dioxide into molecular oxygen and carbon include accelerating carbon dioxide molecules against a solid surface at an incident angle such that the carbon dioxide molecules have kinetic energy $E_0$ of between 10 and 300 eV at collision against the solid surface.

In other embodiments the method further includes accelerating the carbon dioxide molecules prior to the acceleration. In other such embodiments the carbon dioxide molecules are ionized by one of either photoexcitation or energetic electron bombardment.

In still other embodiments the accelerated carbon dioxide molecules have a kinetic energy of between 20 and 200 eV.

In yet other embodiments the carbon dioxide molecules subjected to acceleration are produced in a carbon dioxide plasma. In some such embodiments the plasma ionizes the carbon dioxide molecules to produce carbon dioxide ions, and wherein the potential of the plasma is externally adjusted to produce an electric field in the plasma such that the carbon dioxide ions are accelerated to the kinetic energy $E_0$.

In still yet other embodiments the solid surface comprises grounded metal electrodes.

In still yet other embodiments the solid surface comprises one or more element selected from the group: any element of rows 4, 5, and 6 of the Periodic table, an oxide of any element thereof, any combination thereof.

In still yet other embodiments the solid surface comprises one or more element selected from the group: Ti, V, Cr, Mn, Fe, CO, Ni, Cu, Zn, Ge, Y, Zr, Nb, Mo, Ru, Rh, Pd, Ag, In, Sn, Sb, Te, Ce, Hf, Ta, Re, Os, Ir, Pt, Au, Pb, Bi, an oxide of any element thereof, any combination thereof.

In still yet other embodiments the solid surface is selected from the group of silicon oxide or indium tin oxide.

In still yet other embodiments the acceleration occurs via application of an electric field.

In still yet other embodiments the conversion efficiency of carbon dioxide molecules to molecular oxygen is up to 33%.

In still yet other embodiments the conversion efficiency of carbon dioxide molecules to molecular oxygen is at least 5%.

Many other embodiments are directed to an apparatus for splitting carbon dioxide into molecular oxygen and carbon, including:
- a source of a gaseous mixture comprising carbon dioxide gas,
- a solid surface,
- a molecular accelerator configured to selectively accelerate the carbon dioxide molecules against the solid surface at an incident angle, such that the kinetic energy of the carbon dioxide molecules at collision against the solid surface is between 10 and 300 eV.

In other embodiments the apparatus further includes an ionizer for ionizing the carbon dioxide molecules prior to the acceleration, and wherein the molecular accelerator comprises an electric field.

In still other embodiments the carbon dioxide molecules are ionized by one of either photoexcitation or energetic electron bombardment.

In yet other embodiments the accelerated carbon dioxide molecules have a kinetic energy of between 20 and 200 eV.

In still yet other embodiments the carbon dioxide molecules subjected to acceleration are produced in a carbon dioxide plasma. In some such embodiments the plasma ionizes the carbon dioxide molecules to produce carbon dioxide ions, and wherein the potential of the plasma is externally adjusted to produce an electric field in the plasma such that the carbon dioxide ions are accelerated to the kinetic energy $E_0$.

In still yet other embodiments the solid surface comprises one or more grounded metal electrodes.

In still yet other embodiments the solid surface comprises one or more biased metal electrodes.

In still yet other embodiments the solid surface is selected form the group consisting of any element of rows 4, 5, and 6 of the Periodic table, an oxide of any element thereof, any combination thereof.

In still yet other embodiments the solid surface is selected form the group consisting of Ti, V, Cr, Mn, Fe, CO, Ni, Cu, Zn, Ge, Y, Zr, Nb, Mo, Ru, Rh, Pd, Ag, In, Sn, Sb, Te, Ce, Hf, Ta, Re, Os, Ir, Pt, Au, Pb, Bi, an oxide of any element thereof, any combination thereof.

In still yet other embodiments the solid surface is selected form the group of silicon oxide or indium tin oxide.

In still yet other embodiments the conversion efficiency of carbon dioxide molecules to molecular oxygen is up to 33%.

In still yet other embodiments the conversion efficiency of carbon dioxide molecules to molecular oxygen is at least 5%

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 1a-c summarize scattering dynamics of the three molecular ion products ($CO_2^+$ in FIG. 1a, $O_2^+$ in FIG. 1b, and $O_2^-$ in FIG. 1c) resulting from $CO_2^+$ collisions with Au surface in accordance with embodiments of the application.

FIG. 3b provides data summarizing a kinematic analysis of the collision sequence depicted in FIG. 3a.

DETAILED DISCLOSURE

Figure 2A:
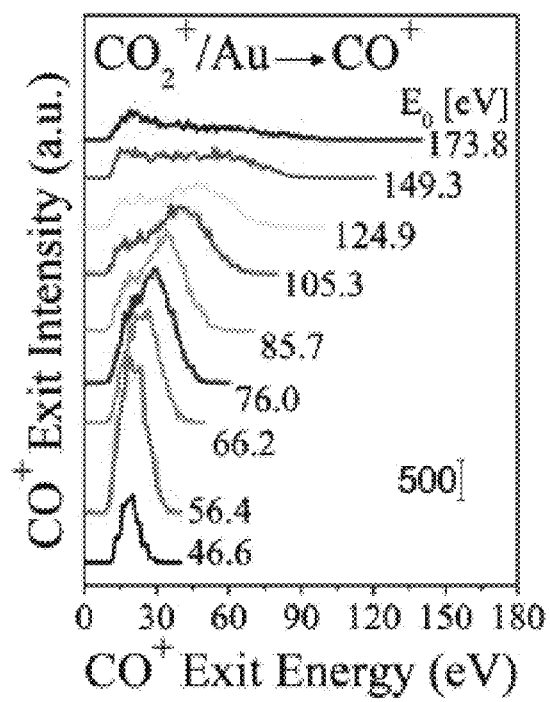
FIGS. 2a-d provide spectra confirming the presence of fragmentation products in $CO_2^+$ collisions with Au surface in accordance with embodiments of the application.
Figure 2B:
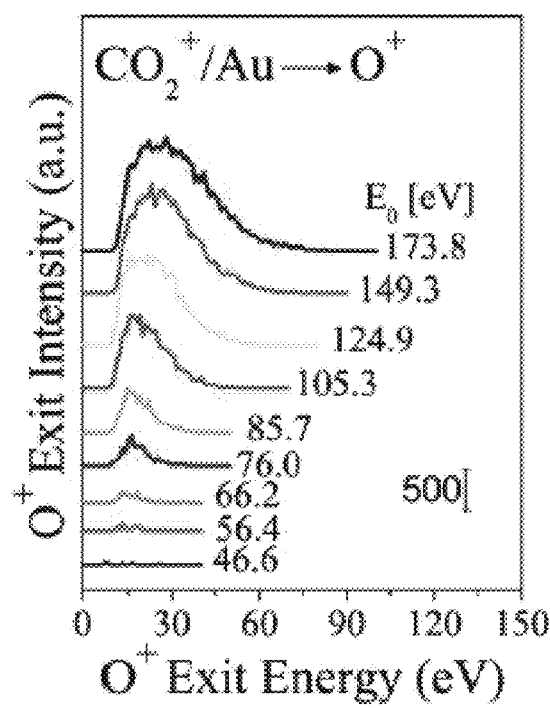
Figure 2C:
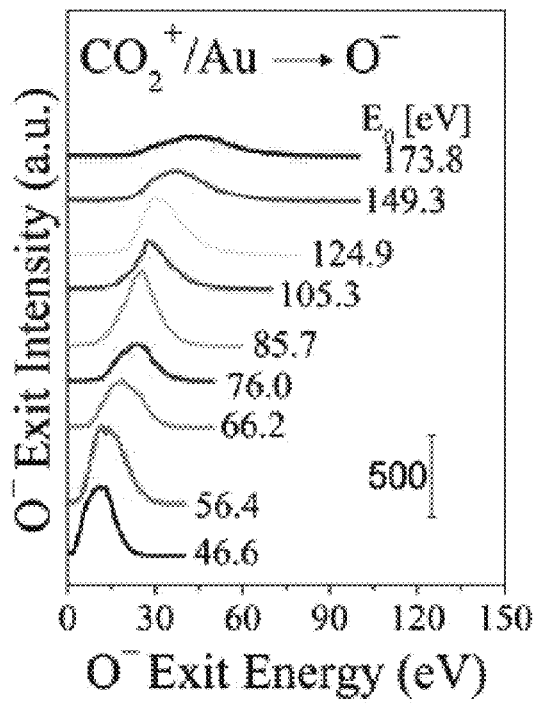
Figure 2D:
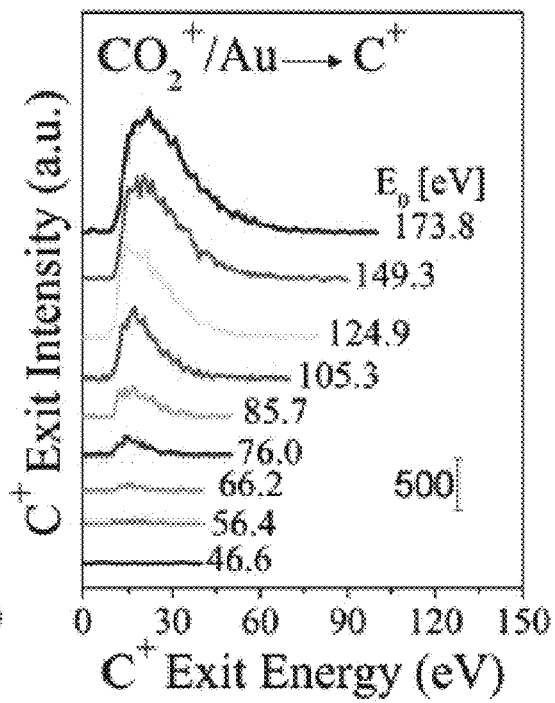

Turning to the drawings and data, methods and apparatus for the facile conversion of $CO_2$ to molecular oxygen are provided. It will be understood that the embodiments of the invention described herein are not intended to be exhaustive or to limit the invention to precise forms disclosed. Rather, the embodiments selected for description have been chosen to enable one skilled in the art to practice the invention.

Despite the pressing demand for effective removal of $CO_2$ from the atmosphere and apparent benefits of converting $CO_2$ specifically into $O_2$, only one abiotic pathway to $O_2$ was known until recently, namely, the three-body recombination reaction, $O+O+M \rightarrow O_2+M$, where the requisite atomic oxygen arises from $CO_2$ photo-dissociation and M is a third body (Kasting, J. F., Liu, S. C., Donahue, T. M. Oxygen levels in the prebiological atmosphere. *J. Geophys. Res.* 84, 3097-3107 (1979); and Segura, A., Measows, V. S., Kasting, J. F., Crisp, D., Cohen, M. Abiotic formation of $O_2$ and $O_3$ in high-$CO_2$ terrestrial atmospheres. *Astron. Astrophys.* 472, 665-679 (2007); the disclosures of which are incorporated herein by reference). This finding was superseded by the discovery of two new pathways for direct $O_2$ formation from $CO_2$: one via vacuum ultraviolet (VUV) photo-dissociation (as described in Lu, Z., Chang, Y. C., Yin, Q. Z., Ng, C. Y. & Jackson, W. M. Evidence for direct molecular oxygen production in $CO_2$ photodissociation. *Science* 346, 61-64 (2014), the disclosure of which is incorporated herein by reference) and one via dissociative electron attachment (DEA) (as described in Wang, X. D., Gao, X. F., Xuan, C. J. & Tian, S. X. Dissociative electron attachment to $CO_2$ produces molecular oxygen. *Nature Chem.* 8, 258-263 (2016), the disclosure of which is incorporated herein by reference). In both of these latter studies, direct detection of the neutral $O_2$ photoproduct was not possible because of background interference. Instead, experimental evidence for the dissociation reaction of a highly-excited $CO_2$ electronic state (Suits, A. G. & Parker, D. H. Hot molecules-off the batten path. *Science* 346, 30 (2014), the disclosure of which is incorporated herein by reference) into the $C(^3P)+O_2$ ($X^3\Sigma g^-$) products was based on detecting the complementary atomic $C^+$ or $C^-$ fragment. In addition, $O_2^+$ ions from the photo-dissociation of $CO_2$ were recently detected using strong laser fields to photo-produce the doubly-ionized $CO_2^{++}$ state, which dissociates into $C^++O_2^+$, altogether a very inefficient process (Larimian, S. et al. Molecular oxygen observed by direct photoproduction from carbon dioxide. *Phys. Rev. A* 95, 011404 (2017), the disclosure of which is incorporated herein by reference). Direct production of $O_2^-$ from dissociative attachment in $CO_2$ has collision cross sections so small (~$10^{-24}$ cm$^2$) that "signal must be accumulated over several days" to observe it even with extremely sensitive detection systems (Spence, D. & Schulz, G. J. Cross sections for production of $O_2^-$ and $C^-$ by dissociative electron attachment in $CO_2$: an observation of the Renner-Teller effect. *J. Chem. Phys.* 60, 216-220 (1974), the disclosure of which is incorporated herein by reference). Therefore, new methods for the efficient splitting of $CO_2$ to produce $O_2$ are highly desirable and sought after in areas ranging from atmospheric science to space travel.

Direct conversion of $CO_2$ into molecular oxygen is an energetically very unfavorable reaction. In principle, direct dissociation of $CO_2$ can proceed along three pathways (shown below with the indicated dissociation energies):

$$CO_2 \rightarrow CO+O (5.5\ eV) \qquad (I)$$

$$CO_2 \rightarrow C+O_2 (5.8\ eV) \qquad (II)$$

$$CO_2 \rightarrow C+2O (11.0\ eV) \qquad (III)$$

Channel (I) describes the primary partial dissociation reaction, which has been widely studied in photochemistry and in heterogeneous catalysis under thermal activation conditions (as detailed, for example, in: Rosen, B. A. et al. Ionic liquid-mediated selective conversion of $CO_2$ to CO at low overpotentials. *Science* 334, 643-644 (2011); and Liu, M. et al. Enhanced electrocatalytic $CO_2$ reduction via field-induced reagent concentration. *Nature* 537, 382-386 (2016), the disclosures of which are incorporated herein by reference). Channel (III) represents the energetically expensive complete dissociation of $CO_2$ with cleavage of both C—O bonds. In contrast, channel (II) is an exotic pathway, which requires extensive intramolecular bond rearrangement within the triatomic $CO_2$, despite the fact that its dissociation energy is only 0.3 eV larger than that of channel (I). However, simulations have shown a possible way to realize channel (II) by first forming the cyclic $CO_2$ complex [c-$CO_2$ ($^1A_1$)], which then must transform into the collinear COO ($^1\Sigma^+$) intermediate on its way to dissociation into C+$O_2$. The first step in this scheme requires bending of the linear $CO_2$ molecule in order to bring the two O atoms in close proximity. Although inaccessible by thermal activation, the barrier to bending may be, in theory, overcome by other means of excitation, such as VUV photon irradiation or energetic electron bombardment.

It has now been discovered that, as described in the embodiments of this invention, channel (II) can also be activated by energetic collisions of $CO_2$ molecules (or, in some embodiments, of their $CO_2^+$ ion analogs) with solid surfaces. In many such embodiments, when $CO_2^+$ ions are collided with a solid surface, $O_2$ molecules and $O_2^\pm$ ions evolve directly from a scattered excited state ($CO_2^*$) undergoing late fragmentation. Accordingly, this application is directed to embodiments of an unexpected and surprisingly efficient method for facilitating an intramolecular reaction that occurs in single collisions of $CO_2$ molecules (or their derivatives amenable to controllable acceleration, such as $CO_2^+$ ions) with a solid surface, such that molecular oxygen (or its relevant analogs, e.g., $O_2^+$ and $O_2^-$ ions) is directly produced. In many embodiments of the invention, the reaction is driven by momentum of the $CO_2$ molecule or ion accelerated against a surface and incoming at an incident angle and will occur irrespective of the surface composition and temperature. However, in many embodiments, the yield of $O_2$ production from $CO_2$ splitting does depend on surface composition in so far as surfaces that would be reactive with $CO_2$ or its fragmentation products can poison the reaction. In some embodiments, the method may be used to remove $CO_2$ from Earth's atmosphere, while, in other embodiments, the method may be used to prevent the atmosphere's contamination with $CO_2$ emissions. In yet other embodiments, the method may be used to obtain molecular oxygen in $CO_2$-rich environments, such as to facilitate exploration of extraterrestrial bodies with $CO_2$-rich atmospheres (e.g. Mars).

In many embodiments, the method for splitting carbon dioxide into molecular oxygen and carbon comprises accelerating molecules of $CO_2$ to a specific desired velocity, such that the accelerated molecules collide with a solid surface with kinetic energies between 10 and 300 eV. It will be understood that, within this kinetic energy range, the actual amount of energy required for the optimum conversion to $O_2$ is determined by such parameters as the angle at which the accelerated $CO_2$ molecule or ion approaches the surface prior to the collision and the atomic mass of the surface atoms. In many embodiments, larger kinetic energies are required to facilitate the reaction for larger angles of incidence $\theta$ with respect to the surface normal vector, wherein the least amount of required energy corresponds to normal incidence. More specifically, in many embodiments, if $E_0$ is the required kinetic energy for maximum conversion at an angle of incidence $\theta$, then the corresponding energy for normal incidence would be $E_0 \cos^2 \theta$.

Without being bound by any theory, the kinematic analysis of the collisional process suggests that $CO_2$ collisions with the provided surface under the disclosed herein conditions extensively perturb the $CO_2$ intramolecular triatomic geometry and produce a strongly bent $CO_2$ excited state, which, subsequently, dissociates to yield molecular as well as ionized $O_2$. The disclosed herein process is reminiscent of exotic photochemical pathways for $CO_2$ decomposition, but, unlike any known pathway, which typically have very low $O_2$ yields, the intramolecular $CO_2$ decomposition conducted according to the embodiments of this invention has an estimated $O_2$ yield of ~33±3%. For comparison, the yield of previously reported $CO_2$ photo-dissociation pathways is ~5±2%.

Of course, it will be understood that any acceleration technique known in the art can be employed to bring $CO_2$ molecules to the velocities and surface striking energies necessary to enable the method of this application. Several approaches are known in the art to produce positively charged $CO_2$ ions and to controllably accelerate them with an applied electric field. Accordingly, in many embodiments, prior to acceleration, the $CO_2$ molecules are ionized via photo-excitation with ultraviolet light. In some other embodiments, the $CO_2$ molecules are ionized by means of energetic electron bombardment under low pressure. In yet other, preferred embodiments, $CO_2$ plasma is used to produce $CO_2^+$, which are accelerated against a biased surface with appropriate energy. In yet another embodiment, the solid surface may be moving against heated $CO_2$ molecules at the required velocity.

In many embodiments, $O_2$ ions are directly produced in hyperthermal $CO_2^+$ collisions against Au surfaces. Specifically, FIGS. 1a to 1c summarize exemplary scattering dynamics of such $CO_2^+$/surface collisions, by showing energy distributions for three of its molecular ion products: $CO_2^+$ (FIG. 1a), $O_2^+$ (FIG. 1b), and $O_2^-$ (FIG. 1c) for various $CO_2^+$ beam energies ($E_0$) (as annotated on each panel), and shows that both $O_2$ ions are detected at certain, relatively narrow energy ranges, along with some amount of survived $CO_2^+$. Accordingly, first, FIG. 1a shows that a very weak scattered $CO_2^+$ signal is detected at beam energies ($E_0$) below 100 eV. Furthermore, the scattered $CO_2^+$ ion exit energy varies in proportion to the $CO_2^+$ incidence energy, thus precluding physical sputtering as its origin. Observing dynamic $CO_2^+$ signal is important because it proves that some $CO_2$ survives the collision. In addition, the observed kinematics provide insight into the collision sequence of the constituent atoms of the triatomic molecule impinging onto the metal surface. Second, in FIGS. 1b and 1c a strong scattered $O_2$ signal is observed in both charge polarities, $O_2^+$ and $O_2^-$. Here, in contrast to the $O_2^-$ energy spectra, the $O_2^+$ signal appears somewhat noisy, owing to detector (channeltron) operation. As observed for the scattered $CO_2^+$, the $O_2^+$ and $O_2^-$ ion exit energies increase monotonically with the $CO_2^+$ incidence energy. For both polarities, the scattered $O_2$ ion signal intensity goes through a maximum, then it dies out for $E_0>150$ eV. Interestingly, the $O_2^+$ energy spectra develop a shoulder at ~20 eV for beam energies greater than 100 eV due to physical sputtering. As noted above, the $O_2^+$ and $O_2^-$ spectra intensities cannot be directly compared due to differences in how the detector is biased.

Notably, the demonstrated $O_2$ formation is unexpected, since collision-induced dissociation of $CO_2^+$ is expected to occur via channel (I) at low collision energies, followed up by channel (III) at larger incidence energies. Indeed, FIGS. 2a-d show that all of the $CO_2^+$ dissociation products: $CO^+$, $O^+$, $O^-$, and $C^+$, are detected in $CO_2^+$/Au collisions. Furthermore, the exit energies of the $CO^+$ and $O^-$ peaks vary with incidence energy (FIGS. 2a and 2c), indicating they are produced dynamically within the surface collision. However, as will be shown below, these fragments originate from the same excited state as the one producing the $O_2$ ions. In contrast, the position of the $O^+$ and $C^+$ peaks is almost invariant around 20 eV (Exit Energy), suggesting a different origin. The appearance of scattered $C^+$ products for $E_0>70$ eV confirms that complete dissociation of $CO_2$ via channel (III) also occurs.

Figure 3A:
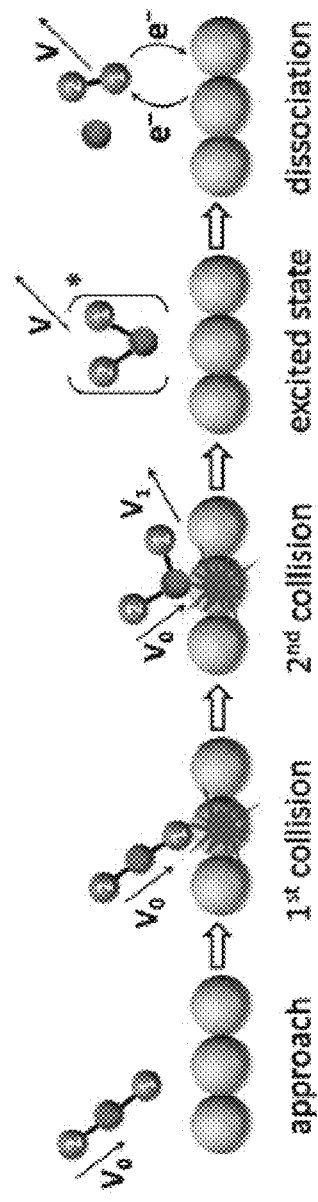
FIG. 3a schematically illustrates the collision sequence of an accelerated linear $CO_2$ molecule scattering on surface, in accordance with embodiments of the application.

Since scattered $CO_2^+$ ions are detected along with other collision products, a fraction of the incident ions must survive the hard collision. The kinematics (described in Yao, Y. & Giapis, K. P. Kinematics of Eley-Rideal reactions at hyperthermal energies. *Phys. Rev. Lett.* 116, 253202 (2016), the disclosure of which is incorporated herein by reference) of the scattered $CO_2^+$ ions can help elucidate the scattering mechanism, which in turn provides clues for the formation of $O_2$. Accordingly, FIG. 3a schematically illustrates the collision sequence of a linear $CO_2$ molecule scattering on a solid surface according to many embodiments of this invention. In this scheme, the leading O atom collides with the surface first, followed by collision of the complementary CO moiety, and further followed by the molecule bending during the hard collision and forming of an excited triangular state, which, in turn, undergoes late dissociation into $C+O_2$.

Figure 3B:
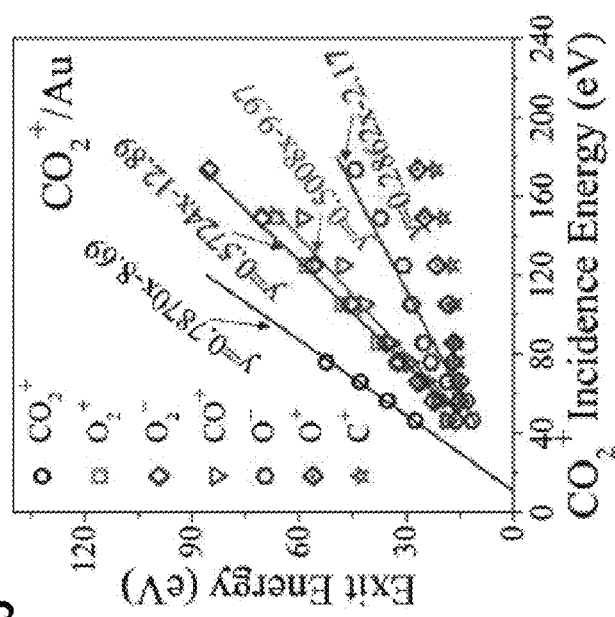

FIG. 3b provides ion exit energies of $CO_2^+$, $O_2^+$, $O_2^-$, $CO^+$, $O^-$, and $C^+$ ions as a function of $CO_2^+$ incidence energy, along with corresponding one-parameter linear fittings as solid lines. Here, the slope for $CO_2^+$ is calculated from binary collision theory (BCT), assuming two sequential collisions as proposed in the scheme depicted in FIG. 3a; while the other slopes are calculated by assuming a common excited $CO_2$ precursor state fragmenting spontaneously into daughter ions. It should be noted, that since the $O_2^+$ exit energy data overlaps with the $O_2$ data, only the linear fitting for $O_2^-$ is shown in FIG. 3b. In view of the data presented in FIG. 3b, first, if $CO_2^+$ scatters as a whole molecule (i.e., a hard sphere with atomic mass of 44 Dalton), BCT predicts a kinematic factor of 0.6349, which does not fit well the energy data shown in FIG. 3b. This is not surprising given the quasi-linear triatomic nature of the $CO_2^+$ ion (as explained in Walsh, A. D. The electronic orbitals, shapes, and spectra of polyatomic molecules. Part II. Non-hydride $AB_2$ and BAC molecules *J. Chem. Soc.*, 2266-2288 (1953); and Grimm, F. A. & Larsson, M. A Theoretical Investigation of the Low Lying Electronic States of $CO_2^+$ in Both Linear and Bent Configurations. *Phys. Scr.* 29, 337-343 (1984); the disclosures of which are incorporated herein by reference). The next plausible scattering model assumes that parts of the molecular ion suffer distinct and successive collisions without molecular dissociation (as depicted in FIG. 3a): first the leading O atom collides with a surface Au atom, then the remaining CO moiety collides with the same Au atom. This model is similar to how diatomic molecules scatter on metal surfaces (as described, for example in Yao, Y. & Giapis, K. P. Direct hydrogenation of dinitrogen and dioxygen via Eley-Rideal reactions. *Angew. Chem. Int. Ed.* 55, 11595-11599 (2016), the disclosure of which is incorporated herein by reference). Applying BCT to the sequential collision scattering model yields a kinematic factor of 0.7870, which fits perfectly the $CO_2^+$ exit energy data provided in FIG. 3b. This scattering behavior has been verified for another quasi-linear molecular ion, $NO_2^+$, when scattering on Au surfaces (described in Pfeiffer, G. V. & Allen, L. Electronic structure and geometry of $NO_2^+$ and $NO_2^-$. *J. Chem. Phys.* 51, 190-202 (1969), the disclosure of which is incorporated herein by reference).

Accordingly, in many embodiments, facilitating energetic $CO_2^+$ scattering against a biased surface affects the angular configuration of the $CO_2$ molecule during the collision and results in the unexpectedly efficient $O_2$ production. Although not to be bound by theory, according to the disclosed herein mechanism and for many $CO_2$ approach geometries, one of the O atoms of the $CO_2$ molecule collides with the surface first and then rebounds in closer proximity to the other O atom in the resulting CO moiety. This mechanical deformation of the $CO_2$ molecule is equivalent to a bending mode but occurs at much faster timescales than vibronic interactions (Renner-Teller effect). In addition, electronic excitation may also occur during the hard collision (as explained in Mace, J., Gordon, M. J. & Giapis, K. P. Evidence of simultaneous double-electron promotion in F+ collisions with surfaces. *Phys. Rev. Lett.* 97, 257603 (2006), the disclosure of which is incorporated herein by reference). Therefore, according to many embodiments, a strongly bent, highly excited $CO_2^*$ state is produced in $CO_2$/surface collision, which next decomposes preferentially into $C+O_2$ on the rebound from the surface. Furthermore, in some embodiments, charge exchange of the $CO_2$ dissociation fragments with the surface may aide the ionization of the $O_2$ (FIG. 3a). In other embodiments, the excited state may split directly into ion pairs.

Furthermore, the very weak signal observed for $CO_2^+$ scattered according to the embodiments of the invention implies a very low survival probability. $CO_2^+$ fragmentation can occur before, during, or after the hard collision with the surface. Only delayed fragmentation, for example, of a rebounding highly excited $CO_2^*$ precursor state, can explain dissociation products having the same exit velocity as the precursor. Therefore, according to some embodiments, the kinematic factors of $O_2$, CO and O products can be calculated from energy conservation to be 0.5724, 0.5008, and 0.2862, respectively. The linear $O_2^-$, $CO^+$ and $O^-$ ion exit data are fitted very well with these kinematic factors as slopes (FIG. 3b). However, the $O^+$ and $C^+$ data cannot be fitted linearly, wherein their broader distributions suggest that other processes, such as surface sputtering, contribute to the measured peaks at lower energies, rendering de-convolution of the contribution from excited $CO_2^*$ difficult.

Figures 4A, 4B:
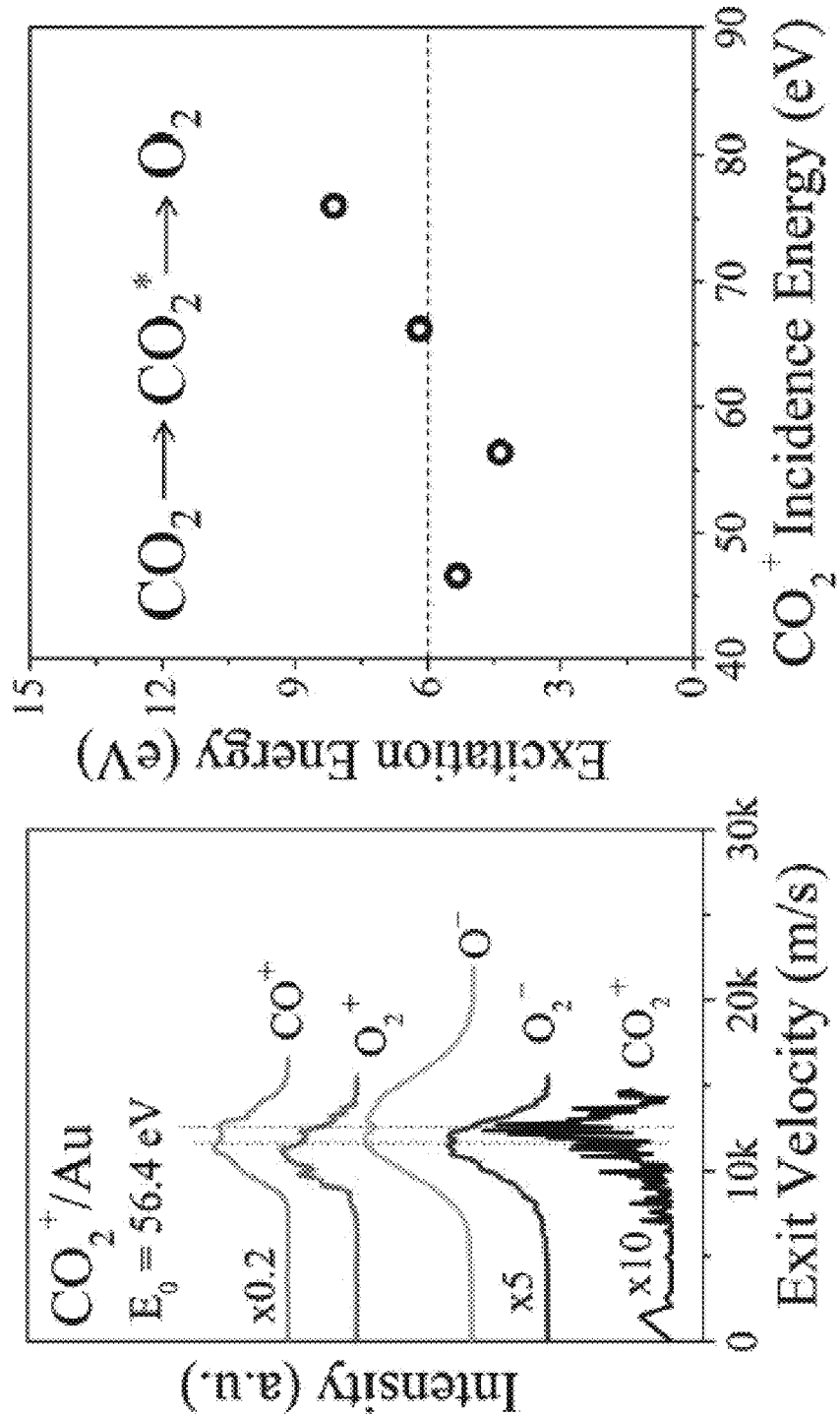
FIGS. 4a-b illustrate a velocity analysis (a) and estimation of the $CO_2^*$ excitation energy (b) for scattered $CO_2$ dissociation products in accordance with embodiments of the application.

According to many embodiments and the observed kinematics of the ion exits from $CO_2^+$ scattering on Au, molecular $O_2$ ions originate in surviving $CO_2$ molecules or ions, possibly highly excited. To further illustrate this process, the distributions of the $CO_2^+$, $O_2^+$, $O_2^-$, $CO^+$ and $O^-$ ion exits for $E_0=56.4$ eV are re-plotted in FIG. 4a as a function of the corresponding ion exit velocity. As seen in FIG. 4a, the exit velocities of scattered $CO^+$, $O_2^+$ and $O_2^-$ line up very well, thus confirming the single precursor origin, while the $O^-$ peak is somewhat broader than the latter three and overlaps partially with the $O_2$ ion exit peaks. Surprisingly, the surviving $CO_2^+$ is clearly faster than the $O_2$ ion products. Therefore, the $CO_2^*$ undergoing post-collisional dissociation according to the embodiments of the invention must become internally excited by inelastic processes, which, in turn, robs kinetic energy from the incident $CO_2^+$ and results in its slower exit. Although the putative $CO_2^*$ state cannot be directly detected, the additional energy needed to produce it can be estimated by assuming that the daughter $O_2^-$ ion is emitted with the $CO_2^*$ exit velocity. Then, the kinetic energy difference between $CO_2^+$ and $CO_2^*$ can be estimated and should be a measure of the relative excitation energy. Accordingly, FIG. 4b summarizes the results of this simple calculation as a function of $E_0$. Notably, for $E_0$<70 eV, the relative excitation energy is about 6 eV—a value remarkably close to that required for $CO_2$ partial dissociation according to channel (I) mechanism, or for direct $O_2$ formation according to channel (II) mechanism. Coincidentally, the energy penalty to form the triangular $CO_2$ state ($^1A_1$) is also 6 eV (as reported in Lu, Z., Chang, Y. C., Yin, Q. Z., Ng, C. Y. & Jackson, W. M. Evidence for direct molecular oxygen production in $CO_2$ photodissociation, *Science* 346, 61-64 (2014), the disclosure of which is incorporated herein by reference). For $E_0$ above 70 eV, the relative excitation energy increases while the scattered $CO_2^+$ signal dies out (FIG. 1a). Simultaneously, $C^+$ ions become detectable suggesting the onset of complete dissociation via channel (III).

Due to the violence of the surface collision, even the surviving $CO_2$ molecular ions can be highly excited. The intercept of the $CO_2^+$ data fitting in FIG. 3b reflects the inelastic energy loss for the $CO_2^+$ ion exit, which amounts to 8.69 eV—most of it going to internal excitation. Adding the inelastic energy loss of the surviving $CO_2^+$, the absolute excitation energy for the $CO_2^*$ precursor could be as high as 14 eV. This energy is comparable to the VUV-photon and electron energy needed for the direct formation of $O_2$ from $CO_2$.

Figure 5:
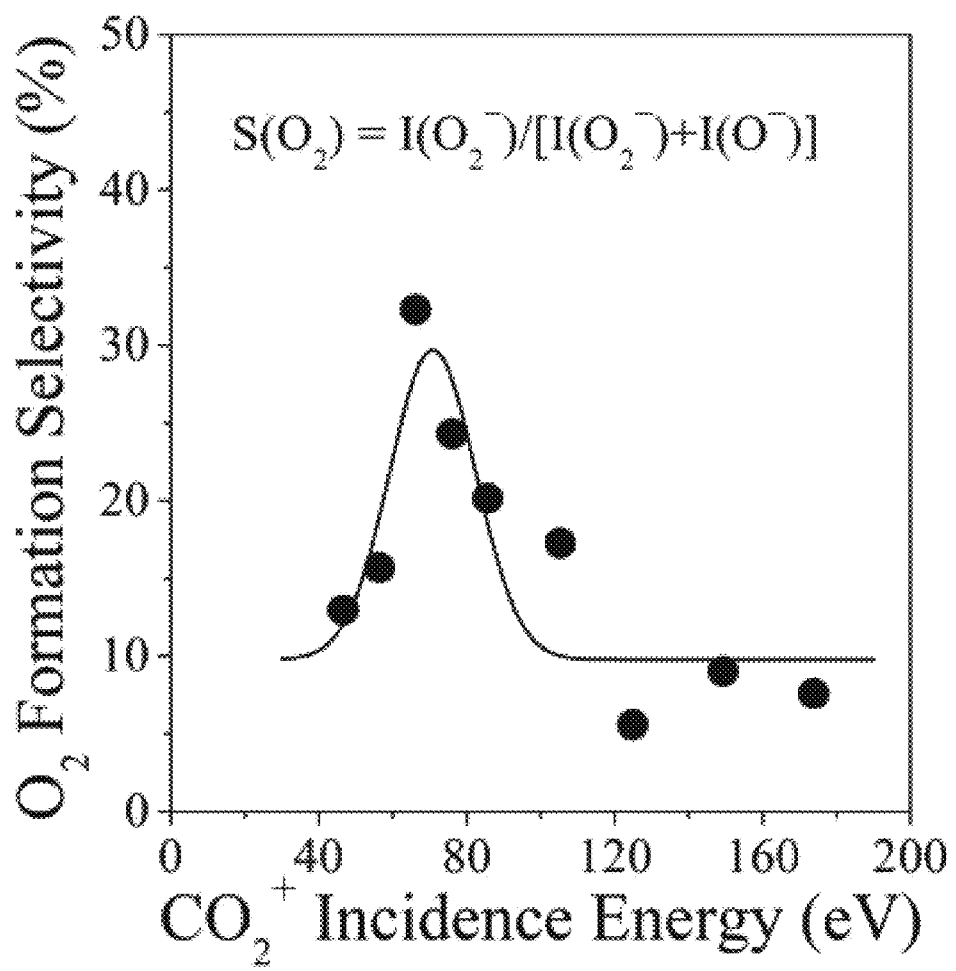
FIG. 5 provides data showing the trend in $O_2$ formation vs. partial dissociation in $CO_2^+$/Au collisions in accordance with embodiments of the application.

An important question for the $CO_2^+$ dissociation reaction into $O_2$ is that of efficiency. One way to assess the efficiency of $CO_2$ dissociation according to the embodiments of the application is in terms of selectivity of channel (II) versus the predominant channel (I). Kinematic analysis has shown that the $CO^+$, $O_2^-$ and $O^-$ products are directly formed from a common parent, the putative $CO_2^*$ excited precursor state. At low $CO_2^+$ incidence energies, the main dissociation pathways are: a) partial dissociation to form CO+O (channel (I)), and b) intramolecular reaction to form $O_2$+C (channel (II)). Assuming that $O_2^-$ and $O^-$ are formed by resonant electron transfer to the corresponding neutrals with the same efficiency, one can use the relative intensity of $O_2^-$ and $O^-$ to estimate the selectivity for $O_2$ formation, $S(O_2)$, defined as follows:

$$S(O_2) = \frac{I(O_2^-)}{I(O_2^-) + I(O^-)},$$

where I is the intensity of the corresponding negative ion exits. Notably, the electron affinities of O atoms and $O_2$ are 1.46 eV and 0.45 eV, respectively, wherein the difference implies that negative ion formation should be more efficient for O than for $O_2$, due to the lower barrier to resonant electron attachment. Therefore, $S(O_2)$, as defined here, underestimates the actual $O_2$ formation selectivity. Furthermore, at high $CO_2^+$ incidence energy, channel (III) also opens up, doubling the number of O atoms and $O^-$ ions produced and, thus, further worsening the estimate for $O_2$ formation selectivity. With these limitations in mind, one can obtain a conservative estimate of the $O_2$ formation selectivity, which is plotted in FIG. 5 as a function of $CO_2^+$ incidence energy. According to the data plotted in FIG. 5, the $O_2$ formation selectivity increases with $E_0$, goes through a maximum of ~33±3% at $E_0$=70 eV, then decreases. The first increase is consistent with more energy available for direct $O_2$ formation. Remarkably, the turnaround point coincides with the opening up of the complete dissociation channel.

Although the above discussed results are based on monitoring ionic products, it is well known in ion-surface collisions, that the majority (~98%) of the ions are neutralized by the surface prior to the collision and thus collide with the surface as neutrals, in this case neutral (uncharged) $CO_2$. Likewise, many scattered $CO_2$ molecules and products of $CO_2$ dissociation will not be charged, nevertheless will be contributing to the $O_2$ yield.

The direct $O_2$ production by collisional activation of $CO_2^+$ according to the embodiments of the application is clearly more efficient than activation using other means, such as high-energy photons or electrons. Indeed, $O_2$ formation by photo-excitation of $CO_2$ has an estimated selectivity of only 5±2% vs. the partial dissociation channel, while DEA processes in $CO_2$ have minuscule cross sections for $O_2$ production. In many embodiments, the higher $O_2$ selectivity in the collisional activation process is attributed to more facile structural rearrangement in the $CO_2$ during the hard collision, which brings the two O atoms closer together.

In some embodiments, the atomic composition of the collision surface affects the $O_2$ yield of $CO_2$ splitting method of the application and must be optimized. Specifically, in many embodiments, surfaces that can be easily sputtered, i.e., where the surface erodes significantly at low incidence energy, or where carbon atoms stick preferentially to the surface to form coatings, are not desirable, as they can interfere with the surface excitation process that facilitates the reaction and poison the $CO_2$ dissociation. Consequently, in many embodiments, the general requirement for the collision surface is that it contains an atom with atomic mass larger than 16-18 Dalton, which is the atomic mass of the elemental oxygen, including its isotopes. In many preferred embodiments, the atomic mass of the collision surface elements is between 20 and 200 Dalton. Furthermore, although surfaces comprising atoms with atomic mass larger than 20 Dalton are acceptable, surfaces comprising atoms with atomic mass heavier than 40 Dalton are preferred. In many embodiments, the collision surface comprises of one or more element found in rows 4, 5, and 6 of the Periodic table or such element's oxide. In some such embodiments, the collision surface is comprised of one or more element from the list: Ti, V, Cr, Mn, Fe, Co, Ni, Cu, Zn, Ge, Y, Zr, Nb, Mo, Ru, Rh, Pd, Ag, In, Sn, Sb, Te, Cd, Hf, Ta, Re, Os, Ir, Pt, Au, Pb, Bi, an oxide of any element thereof, or any combination thereof. In contrast, in many embodiments, surfaces comprising certain elements that might interfere with the $CO_2$ dissociation reaction must be avoided. For example, surfaces comprising tungsten (W) must be avoided in many embodiments, as such surfaces, when oxidized, form a volatile tungsten oxide that vaporizes and consumes the surface.

Figures 6A, 6B, 6C:
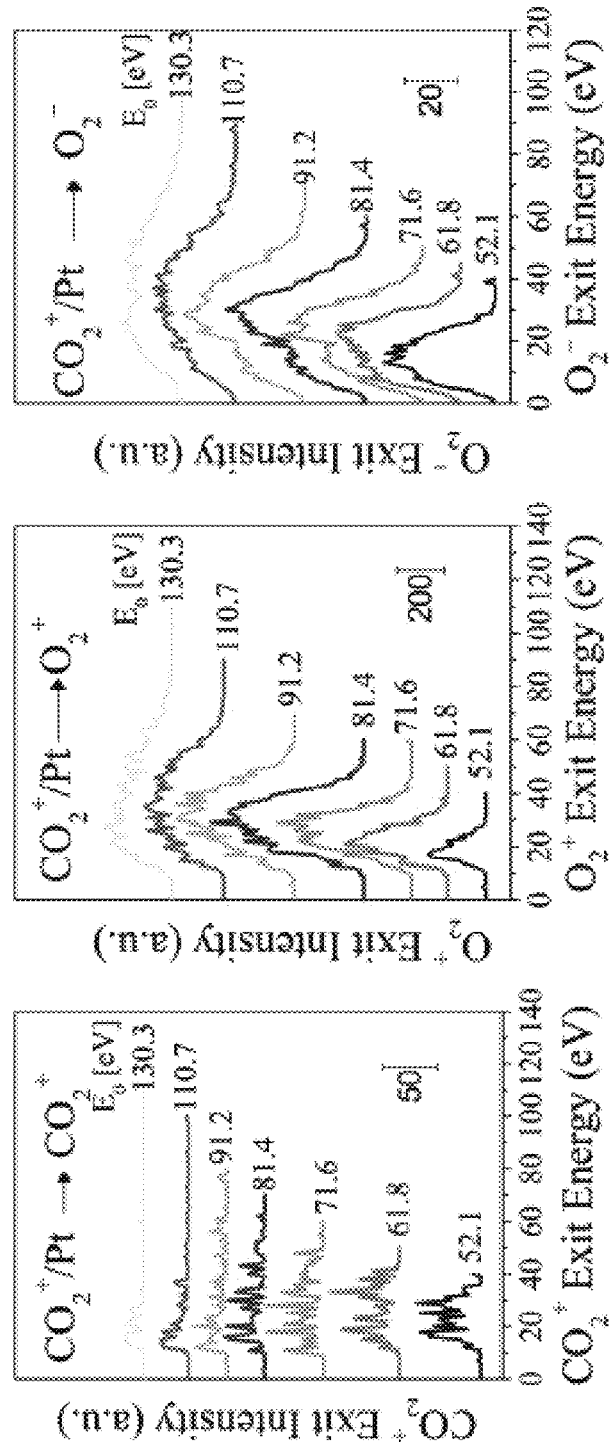
FIGS. 6a-c illustrate energy distributions of $CO_2^+$ (a), $O_2^+$ (b), and $O_2^-$ (c) ion exits from $CO_2^+$/Pt collisions as a function of the respective product exit energy for various $CO_2^+$ beam energies ($E_0$), in accordance with embodiments of the application.
Figure 7A:
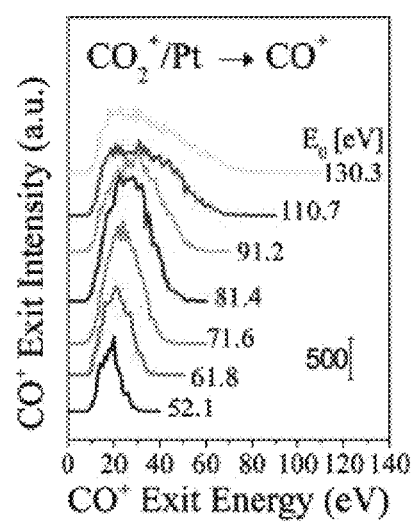
FIGS. 7a-d illustrate energy distributions of dissociation fragments from $CO_2^+$/Pt collisions, in accordance with embodiments of the application.
Figure 7B:
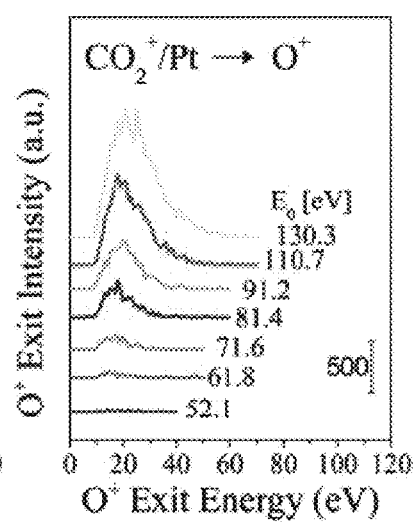
Figure 7C:
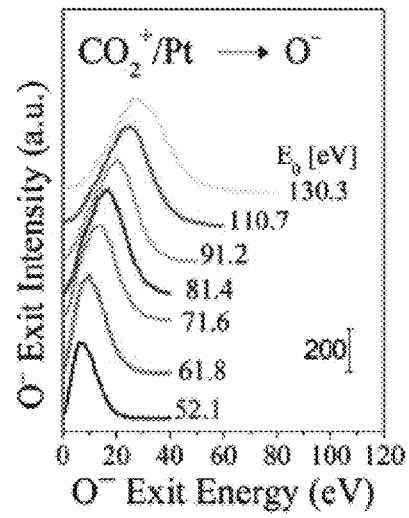
Figure 7D:
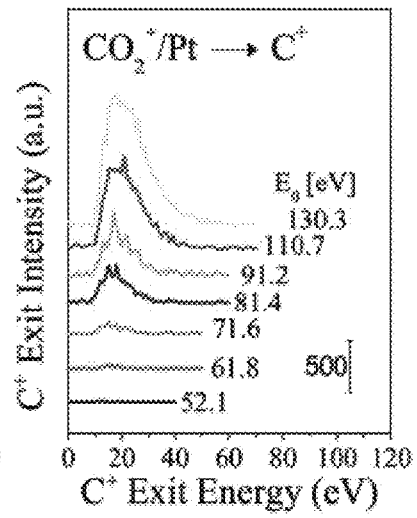
Figure 8:
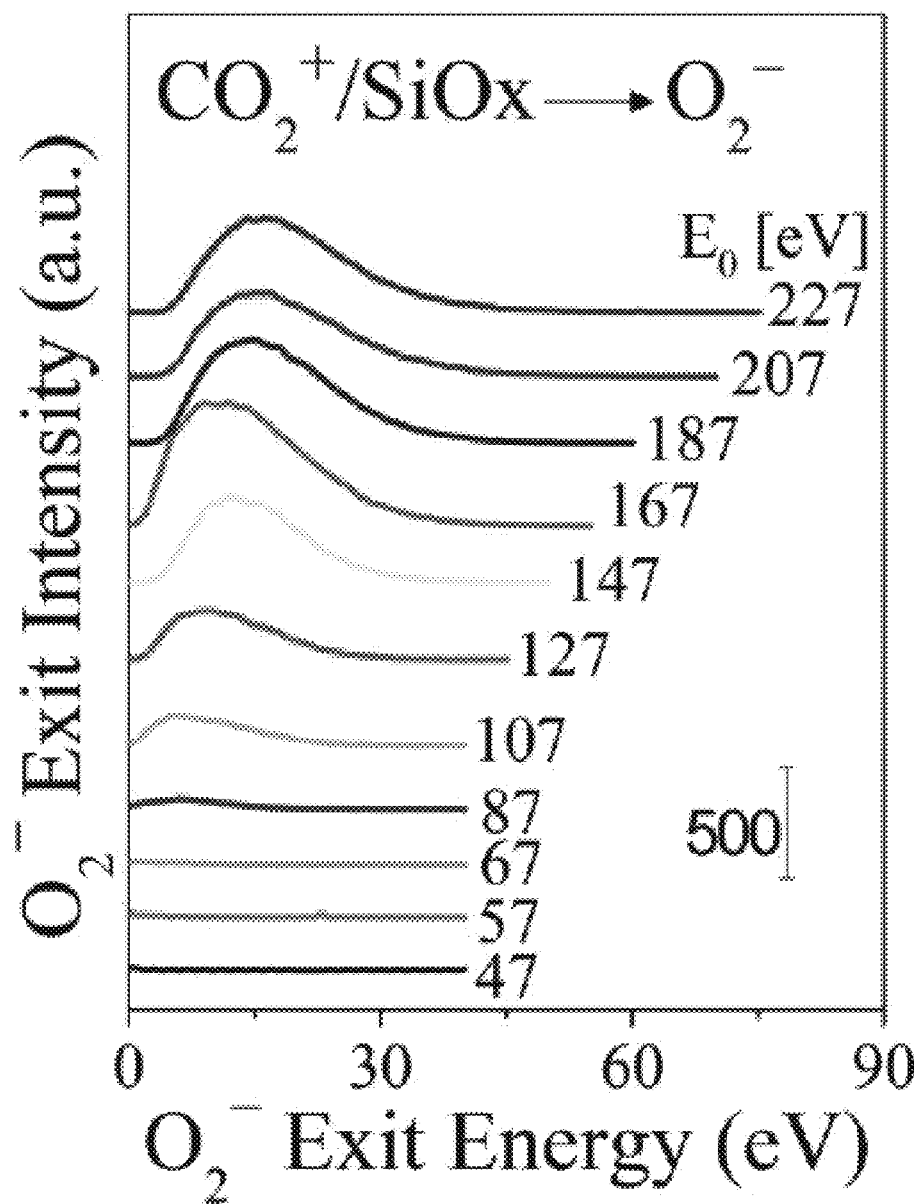
FIG. 8 illustrates energy distributions of $O_2^-$ ions scattered from $CO_2^+$/SiOx collisions, as a function of the $CO_2^+$ incidence energy, in accordance with embodiments of the application.

Furthermore, in many embodiments, the collision enabled $CO_2$ splitting reaction is generic to metal surfaces (FIGS. 6 and 7), and occurs even on oxides (FIG. 8). Specifically, FIGS. 6 and 7 demonstrate that, in some embodiments, efficient splitting of $CO_2$ into $O_2$ can be achieved via $CO_2$ collisions with Pt surfaces, while FIG. 8 shows that, in other embodiments, the similar behavior is observed in $CO_2$ collisions with silicon oxide surfaces.

In many embodiments, the $CO_2$ splitting method of the instant application may be exploited in plasma reactors, wherein ion/wall collisions occur spontaneously at energies determined by the plasma potential. Remarkably, past attempts at using $CO_2$ plasmas were plugged by relatively low $O_2$ conversion, ostensibly because of the slow kinetics for the two-step $O_2$ formation process in gas-phase collisions (as detailed in Spencer, L. F. & Gallimore, A. D. Efficiency of $CO_2$ dissociation in a radio-frequency discharge. *Plasma Chem. Plasma Phys.* 31, 79-89 (2010), the disclosure of which is incorporated herein by reference). However, according to the embodiments of the invention, the $O_2$ yield is greatly improved with the following three modifications to plasma reactor methods of $CO_2$ splitting: a) maximizing the $CO_2^+$ ion density, b) tuning the plasma potential between 40 and 150 eV, and c) providing grounded metal electrodes to enable $CO_2^+$ ion/surface collisions.

Exemplary Embodiments/Experimental Materials and Methods

The following example sets forth certain selected embodiments relate to the above disclosure. It will be understood that the embodiments presented in this section are exemplary in nature and are provided to support and extend the broader disclosure, these embodiments are not meant to confine or otherwise limit the scope of the invention.

All experiments described in the instant application were carried out in a custom-made low-energy ion scattering apparatus described in detail in Gordon, M. J. & Giapis, K. P. Low-energy ion beam line scattering apparatus for surface science investigations. *Rev. Sci. Instrum.* 76, 083302 (2005), the disclosure of which is incorporated herein by reference. The $CO_2^+$ ion beam was extracted from an inductively-coupled plasma, struck in a reactor held at 2 mTorr using a $CO_2$/Ar/Ne gas mixture supplied with 500 W RF power at 13.56 MHz. Ions delivered to a grounded surface at 45° incidence angle; typical beam currents of 5 to 15 μA were spread over a ~3 mm spot. Beam energy was varied between 40-200 eV by externally adjusting the plasma potential. Typical target surfaces were polycrystalline Au foils (5N), sputter-cleaned with an $Ar^+$ ion gun before each run. Scattered ion products, exiting at an angle of 45° in the scattering plane, were energy- and mass-resolved using an electrostatic ion energy analyzer and a quadruple mass spectrometer, respectively. All ions were detected using a channel electron multiplier, biased as appropriate to detect positive or negative ions. Differences in detector bias precluded a direct comparison of signal intensities between product ions of different charge polarities. All collected signals were normalized to the beam current measured on the sample.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. An apparatus for splitting carbon dioxide into molecular oxygen and carbon, comprising:
a source of a gaseous mixture comprising carbon dioxide molecules,
a solid surface, and
a molecular accelerator configured to selectively accelerate the carbon dioxide molecules against the solid surface at an incident angle, such that the input kinetic energy of the carbon dioxide molecules at collision against the solid surface is between 10 and no greater than 300 eV.

2. The apparatus of claim 1, further comprising an ionizer for ionizing the carbon dioxide molecules prior to the acceleration, and wherein the molecular accelerator comprises an electric field.

3. The apparatus of claim 2, wherein the carbon dioxide molecules are ionized by one of either photoexcitation or energetic electron bombardment.

4. The apparatus of claim 1, wherein the kinetic energy of the carbon dioxide molecules at collision against the solid surface is between 20 and 200 eV.

5. The apparatus of claim 1, wherein the carbon dioxide molecules subjected to acceleration are produced in a carbon dioxide plasma.

6. The apparatus of claim 5, wherein the carbon dioxide plasma ionizes the carbon dioxide molecules to produce carbon dioxide ions, and wherein the potential of the carbon dioxide plasma is externally adjusted to produce an electric field in the carbon dioxide plasma such that the carbon dioxide ions are accelerated to the kinetic energy $E_0$.

7. The apparatus of claim 1, wherein the solid surface comprises one or more grounded metal electrodes.

8. The apparatus of claim 1, wherein the solid surface comprises one or more element selected from the group consisting of: any element of rows 4, 5, and 6 of the Periodic table, an oxide of any element thereof, and any combination thereof.

9. The apparatus of claim 1, wherein the solid surface comprises one or more element selected from the group consisting of: Ti, V, Cr, Mn, Fe, Co, Ni, Cu, Zn, Ge, Y, Zr, Nb, Mo, Ru, Rh, Pd, Ag, In, Sn, Sb, Te, Cd, Hf, Ta, Re, Os, Ir, Pt, Au, Pb, Bi, an oxide of any element thereof, and any combination thereof.

10. The apparatus of claim 1, wherein the solid surface comprises a material selected from the group consisting of: silicon oxide and indium tin oxide.

11. The apparatus of claim 1, wherein the acceleration occurs via application of an electric field.

12. The apparatus of claim 1, wherein the conversion efficiency of splitting carbon dioxide to molecular oxygen is up to 33%.

13. The apparatus of claim 1, wherein the conversion efficiency of splitting carbon dioxide to molecular oxygen is at least 5%.

* * * * *